Sept. 16, 1958     E. D. HATCHER     2,852,390

PASTRY CRUST SECTIONS

Filed Jan. 3, 1956

INVENTOR

*Eugenia D. Hatcher*

BY *Cameron, Kerkam & Sutton*

ATTORNEYS

United States Patent Office 2,852,390
Patented Sept. 16, 1958

2,852,390

PASTRY CRUST SECTIONS

Eugenia D. Hatcher, Washington, D. C.

Application January 3, 1956, Serial No. 556,981

3 Claims. (Cl. 99—92)

This invention relates to pre-baked pastry crusts intended for commercial sale as packaged products and to the use of such pre-baked crusts in making pies or other like pastries and desserts. More particularly this invention relates to a packaged product of the aforesaid kind which is designed to be used in making pies or like pastries of different sizes.

Products embodying the invention are particularly useful for making pies with fillings of gel or pudding types which set up or gel after being poured into a pastry shell without requiring further cooking, but may be used with any other type of filling that may be desired. Typical examples are starch puddings of chocolate, banana cream, butterscotch or other desired flavor. Of course, the usual pie is circular in shape and the invention finds its widest application to such circular pastries but it not limited thereto since it can also be used for pastries of other shapes as will be apparent from the following description.

It is an object of the present invention to provide novel pre-baked pie crusts in sections or pieces designed to be sold as a unitary packaged item, but capable of use in making pastries of various sizes.

Another object is to provide a novel method for making pies and like pastries.

Although as already stated the invention can be used in making pastries other than circular in shape, it is applicable most readily to the making of pies in which it may provide either the top crust or the bottom crust or both as may be desired. Pie plates or tins vary in size, however, ranging from about twelve inches interior bottom diameter down to small tart sizes. Thus it is important that a pre-baked pie crust which is sold as a packaged item should be capable of fitting tins or plates of more than one size, and the invention further provides a novel pre-baked crust which satisfies this need.

Generally stated, a packaged item embodying the invention comprises a substantially flat prebaked central crust portion, which is usually circular in shape, together with a plurality of prebaked crust pieces shaped to surround the central portion in substantially co-planar relation to provide an annular extension thereof. The central portion can be used alone if of the right size, but if a larger crust is desired, it can be provided by the addition of one or more surrounding rings of the aforesaid pieces. These pieces are preferably flat and shaped as sectors of an annulus so as to fit fairly closely around the central crust portion without leaving unduly large gaps. When assembled in co-planar relation, the central crust and surrounding sectors can be used as either the bottom crust or the top crust of a pie or other pastry.

In the case of the usual pie, the unit package may also include a plurality of pre-baked side wall crust segments adapted to be set on edge around the rim of the pie plate or tin and to lean outwardly against the same. These side segments can be pre-baked in curved form if desired, but for convenience in packaging and to reduce breakage, it is preferred that they be flat and accordingly they are arranged in tangent positions around the rim of the pie plate. When the bottom crust completely fills the bottom of the pie plate, the tangent side segments rest on top of the bottom crust and thus constitute, geometrically speaking, chords inscribed within the circumference of the bottom crust. If the bottom crust does not completely fill the bottom of the pan, however, it may be desired to rest the side segments on the bottom of the pan in positions tangent to the circumference of the bottom crust. In either case, the length of the side segments should be suitably restricted so that they do not cut off unduly large segmental portions of the bottom crust in the first case, or leave unduly large gaps between their ends and the circumference of the bottom crust in the second place. Shorter side segments are also easier to use in smaller pie plates or tins, since in changing to a smaller size the shorter segments will fit more readily in the plan. Of course, if they do not fit exactly around the circumference of the tin, one of the remaining unused segments may be cut or broken to the correct length to fill the gap.

One embodiment of the present invention is shown by way of example in the accompanying drawing and is described in detail hereinafter, but it is to be expressly understood that said drawing is for purposes of illustration only and is not to be construed as a definition of the limits of the invention, reference being had to the appended claims for this purpose.

Figure 1:
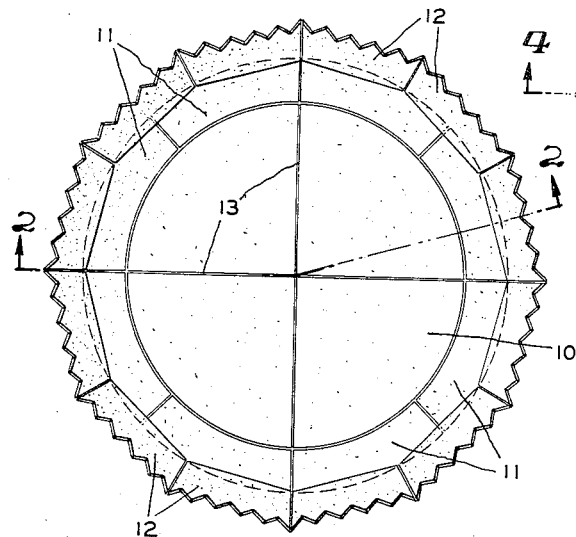
Fig. 1 is a view from above of a pre-baked pie crust in accordance with the present invention, arranged in a large size pie tin for use in making a pie having no top crust.

Fig. 1 illustrates the use of the complete contents of a package for making a pie, or in other words the largest pie that can be made from a given package. This maximum size is of course a matter of choice for the manufacturer. It will be assumed for purposes of description that the packaged material is designed for a maximum size of eight inches interior bottom diameter. The combined radial extent of the central portion and surrounding annulus will thus be eight inches. The relative proportions of the central portion and annulus may be varied as desired. Usually it is preferable for the diameter of the central portion alone to fit a smaller pie tin, say six inches in interior bottom diameter, in which case the radial extent of the annulus will be one inch. It is to be understood, however, that these dimensions have been specified only for purposes of illustration and may be varied as desired.

Figure 2:
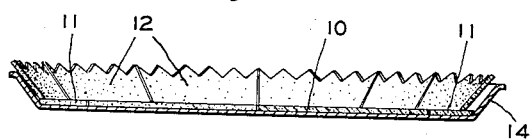
Fig. 2 is a cross-sectional view on line 2—2 of the embodiment of Fig. 1.

In accordance with the present invention the packaged material comprises a plurality of pre-baked crust elements including a flat disk-like central crust 10, usually circular in shape; a plurality of flat crust pieces 11 shaped as sectors of an annulus and adapted to be placed around the circumference of crust 10; and a plurality of flat side-forming segments 12 which may be scalloped on their upper edges, if desired. The central crust 10 may be divided in sections for convenience in packaging; for example, it may be quartered as shown by the dividing lines 13 in Fig. 1. Whether sectioned or not, this central portion together with the sectors 11 forms a crust of the desired size and shape which as shown completely fills the bottom of the pie tin 14 (Fig. 2). Segments 12 are fitted into the pie tin 14 with adjacent ends in substantial contact and lower edges resting on the top of the bottom crust to form therewith a complete pre-baked pie crust. In Fig. 2 the pie tin 14 is shown in section to illustrate this arrangement of the side segments 12 with respect to the bottom crust sectors 11. As shown by the dotted line circumference of the bottom crust in Fig. 1 and in section at the right-hand side of Fig. 2, each segment 12 extends across a small marginal portion of the bottom crust, but as shown at the left-hand side of Fig. 2, the ends of each segment 12 are supported by the rim of the pie tin. Strictly speaking, the side wall of the pie is polygonal rather than circular in shape, but if the length of the segments 12 is suitably limited, this fact makes no practical difference.

After the parts of the pre-baked pie crust are arranged in tin 14 as described, a suitable pie filling is then poured into the pie crust. In most cases this filling will be of the starch pudding or gel-type and will be pre-cooked so that the pie needs only to be put to one side until the filling sets. If necessary, however, the completely formed pie may be subjected to some degree of further baking.

Figure 3:
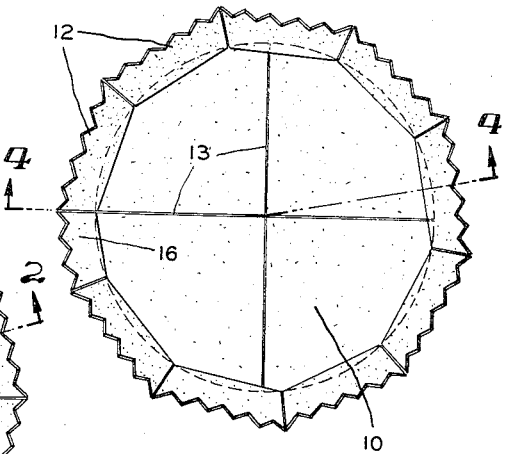
Fig. 3 is a view from above showing the use of the central portion and side segments of Fig. 1 in a smaller pie tin.
Figure 4:
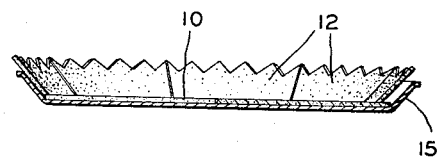
Fig. 4 is a cross-sectional view on the line 4—4 of Fig. 3.

When a smaller pie tin is to be used, say one of six inches interior bottom diameter as illustrated in Figs. 3 and 4, the central crust 10 is employed without the bottom sectors 11 and the side segments 12 are placed around the rim of pie tin 14 resting on the margin of crust 10 in the manner described above with reference to Figs. 1 and 2. Only as many side segments 12 are employed as can be fitted within the rim of the tin 15. Any remaining gap is filled by a piece 16 cut or broken from one of the unused side segments 12.

Figure 5:
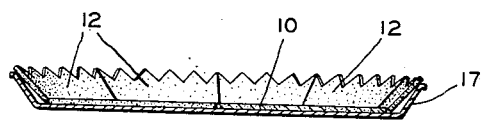
Fig. 5 is a cross-sectional view showing the use of the central portion and side segments of Fig. 1 in a pie tin smaller than of that of Fig. 1 but larger than that of Fig. 3.

The packaged material shown in Figs. 1-4 can also be used to make a pie in a tin of intermediate size, say seven inches in interior bottom diameter, as shown in Fig. 5. In this case the central crust 10 is located centrally in the bottom of the tin 17 and the side segments 12 are placed around the rim of the tin but rest on the bottom of the tin tangent to the circumference of the central crust. Side segments 12 then form an angle with the bottom of pie tin 17 which is different from that formed by the rim of the tin, but are supported by the upper edge of the rim of the tin as illustrated.

From the above it will now be apparent that a unit package embodying the present invention includes a substantially flat pre-baked central crust usually circular in shape; and a plurality of substantially flat pre-baked crust sectors adapted to be assembled therewith in surrounding co-planar relation, the assembly providing a pre-baked flat crust of predetermined size and shape. When sold for making pies, the package also includes a plurality of substantially flat pre-baked crust segments adapted to be fitted together around the interior of the side of the pie tin and in contact with the bottom crust.

The method of utilizing the packaged material in making a pie includes the steps of placing the pre-baked bottom crust in the pie tin, arranging the bottom crust sectors about the circumference of the bottom crust when required, placing the crust side segments against the side of the pie tin and in contact with each other and with the bottom crust, filling the pie crust with the desired filling, and then allowing the filling to set with or without further heating as may be required.

Changes in or modifications of the above described illustrative embodiments of the present invention can be made without departing from the spirit of the present invention and may now be suggested by those skilled in the art. Reference should therefore be had to the appended claims for a definition of the limits of the invention.

What is claimed is:

1. Pre-baked pastry crust sections adapted to be sold as a unit for use in making pastries of different sizes comprising a central crust section of predetermined size and substantially circular shape, and a plurality of crust sectors adapted to be assembled in surrounding substantially co-planar relation with said central crust section to provide a pastry crust of a larger predetermined size and shape, said sectors comprising sections of an annulus the inner radius of which is substantially equal to the radius of said central section.

2. Pre-baked pie crust sections adapted to be sold as a unit for use in making pies of different sizes comprising a substantially circular bottom crust section, a plurality of crust sectors forming sections of an annulus adapted to surround said circular section in substantially co-planar relation to provide a bottom crust of larger size, and a plurailty of side crust segments having substantially straight lower edges resting on the bottom crust and substantially straight ends adapted to be placed on edge in end-to-end relation around the bottom crust to provide the continuous side wall of the complete pie crust.

3. Pre-baked pie crust sections as defined in claim 2, said side crust segments being substantially flat and adapted to provide a side wall of polygonal configuration.

References Cited in the file of this patent
UNITED STATES PATENTS

| | | |
|---|---|---|
| 2,363,395 | Calia | Nov. 21, 1944 |
| 2,430,566 | Harriss | Nov. 11, 1947 |

OTHER REFERENCES

"Everybody's Cook Book," 1924, by Lord, published by Henry Holt and Co. (New York), pp. 144–5 relied on.

H. N. O'Connor: "Pie Cook Book," 1953, published by Arco Publishing Co., Inc. (New York), page 95.